United States Patent [19]

Yoshigai

[11] Patent Number: 5,152,377
[45] Date of Patent: Oct. 6, 1992

[54] ASSEMBLY FOR ADJUSTING FORCE OF RETURN SPRING FOR BICYCLE BRAKE DEVICE

[75] Inventor: Kenichi Yoshigai, Osaka, Japan

[73] Assignee: Yoshigai Kikai Kinzoku Kabushiki Kaisha, Osaka, Japan

[21] Appl. No.: 613,707

[22] PCT Filed: Apr. 2, 1990

[86] PCT No.: PCT/JP90/00449
§ 371 Date: Dec. 4, 1990
§ 102(e) Date: Dec. 4, 1990

[87] PCT Pub. No.: WO90/11926
PCT Pub. Date: Oct. 18, 1990

[30] Foreign Application Priority Data

Apr. 4, 1989 [JP] Japan ............................. 1-40347[U]

[51] Int. Cl.$^5$ ................................................ B62L 1/14
[52] U.S. Cl. ............................. 188/24.11; 188/24.12; 188/24.21; 188/24.22
[58] Field of Search ............... 188/24.11, 24.12, 24.15, 188/24.21, 24.22, 72.3, 166, 216; 267/179

[56] References Cited

U.S. PATENT DOCUMENTS

| | | | |
|---|---|---|---|
| 3,811,541 | 5/1974 | Yoshikawa | 188/24.21 X |
| 4,310,972 | 1/1982 | Isberg et al. | 188/166 X |
| 4,611,690 | 9/1986 | Schoch | 188/24.11 |
| 4,735,106 | 4/1988 | Yoshigai | 188/24.11 X |
| 4,754,853 | 7/1988 | Nagano | 188/24.19 |
| 4,793,444 | 12/1988 | Nagano | 188/24.12 |
| 4,838,386 | 6/1989 | Yoshigai | 188/24.22 |
| 4,838,387 | 6/1989 | Yoshigai | 188/24.12 X |
| 4,871,033 | 10/1989 | Odoni et al. | 188/166 X |

FOREIGN PATENT DOCUMENTS

| | | | |
|---|---|---|---|
| 3720115 | 12/1987 | Fed. Rep. of Germany | 188/24.21 |
| 0898799 | 5/1945 | France | 188/24.21 |
| 1075997 | 10/1954 | France | 188/24.21 |
| 60-30854 | 7/1985 | Japan | . |
| 63-992 | 1/1988 | Japan | . |
| 63-16633 | 5/1988 | Japan | . |
| 63-193128 | 12/1988 | Japan | . |

*Primary Examiner*—Robert J. Oberleitner
*Assistant Examiner*—Peter M. Poon
*Attorney, Agent, or Firm*—Sixbey, Friedman, Leedom & Ferguson

[57] ABSTRACT

The invention relates to an assembly for adjusting the force of a return spring incorporated in a brake arm for bicycles. A brake arm (4) and a return spring (10) are fitted around a pivot (3C) on a mount (3) fixed to the fork (2) of a bicycle. One end (10A) of the return spring (10) is held to one of the mount (3) and the brake arm (4). The other has in screw-thread engagement therewith an adjusting screw (19) provided at its head with a socket portion (20) having the other end (10B) of the return spring (10) fitted therein. The spring force is adjustable, with the other end (10A) of the return spring (10) prevented from lateral displacement.

4 Claims, 4 Drawing Sheets

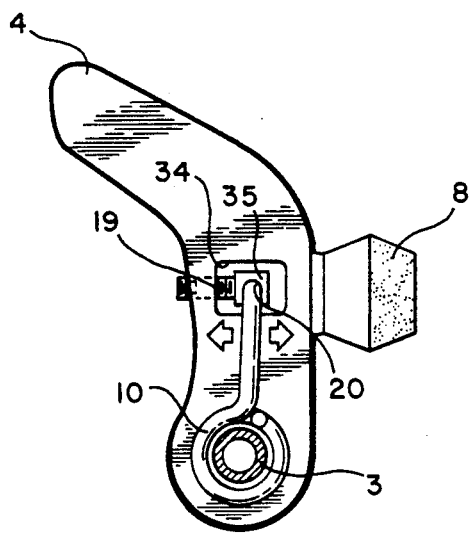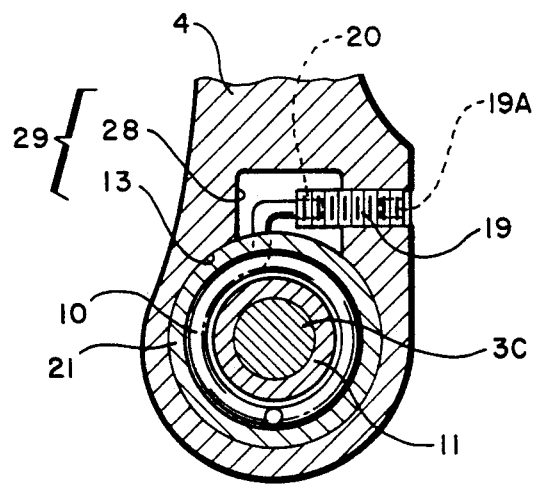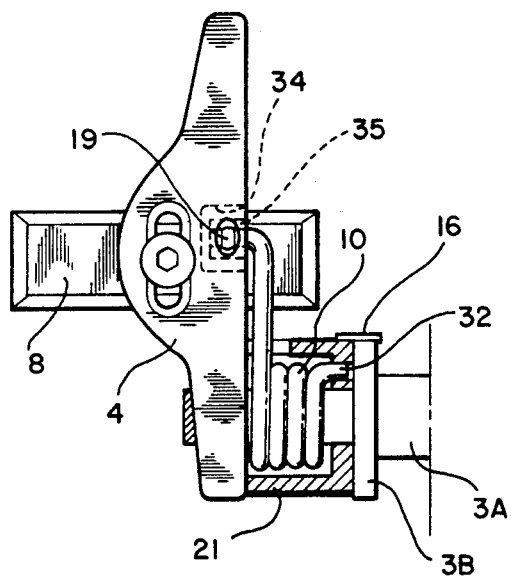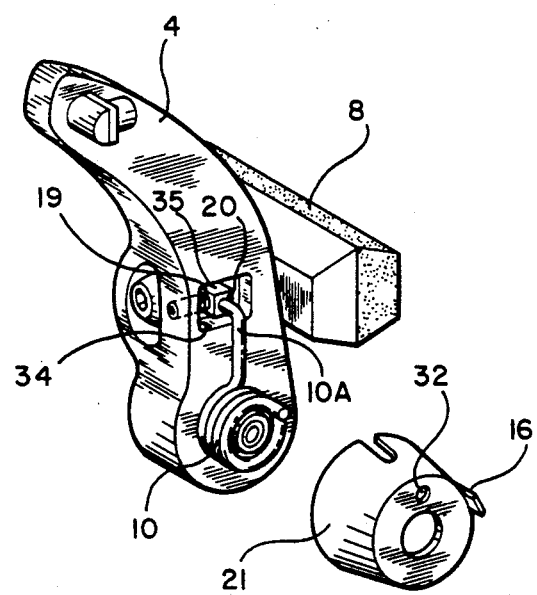

ASSEMBLY FOR ADJUSTING FORCE OF RETURN SPRING FOR BICYCLE BRAKE DEVICE

TECHNICAL FIELD

The present invention relates to an assembly for adjusting the force of a return spring in brake devices for use in bicycles.

BACKGROUND ART

For example, cantilever or center-pull caliper brake devices comprise a pair of brake arm mounts fixed to the fork of a bicycle and each having a pivot, a pair of brake arms movably supported by the respective pivots, and return springs each provided between the brake arm and the mount. Each return spring has its opposite ends held to the brake arm and the mount for biasing the brake arm to position a brake shoe attached to the arm away from the rim of the wheel.

Unexamined Japanese Utility Model Publication SHO 63-992 and the specification of U.S. Pat. No. 4,754,853 disclose assemblies for adjusting the force of the return spring.

According to the prior art, the return spring is held at its one end to the mount side and at the other end thereof to a coupling member on the brake arm side. The coupling member is adjustable by rotating an adjusting screw provided on the brake arm to thereby remedy one-sided action of the brake or adjust the tension (return spring force).

The return spring may be adjusted merely by advancing or retracting the adjusting screw, with the other end of the return spring bearing on the forward end of the adjusting screw. However, if the return spring is merely in bearing contact with the adjusting screw at their opposed ends which are flat, it is likely that one end will be displaced laterally from the other end to render the spring unadjustable. It is therefore useful for reliable adjustment to provide the coupling member as in the prior art.

Nevertheless, the coupling member is rotatable relative to the brake arm and is in face-to-face contact therewith, so that the member encounters very great frictional resistance, becomes difficult to rotate and is likely to break the adjusting screw.

An object of the present invention is to provide an assembly for adjusting the force of a return spring for use in bicycle brake devices wherein an adjusting screw is provided at its forward end with a socket portion having the end of the return spring directly fitted therein to overcome the problem of the prior art.

DISCLOSURE OF THE INVENTION

To fulfill the above object, the present invention provides the following technical means.

More specifically, the invention provides an assembly for adjusting the force of a return spring for a bicycle brake device wherein a brake arm and the return spring are fitted around a pivot on a mount fixed to the body of a bicycle, the return spring having one end held to one of the mount and the brake arm, an adjusting screw being supported by the other in screw-thread engagement therewith, the other end of the return spring bearing on the forward end of the adjusting screw, the adjusting screw being provided at its forward end with a socket portion having the other end of the return spring fitted therein to prevent lateral displacement.

When the adjusting screw is advanced or retracted relative to the mount or the brake arm in the above structure of the present invention, the return spring is expanded or contracted to adjust the force of the spring to return the brake arm relative to the mount. The adjusting spring has the return spring end fitted in the socket portion at its forward end, directly and reliably transmits the amount of movement of the screw to the spring end to adjust the tension, and can be smaller in the force required for adjustment than in the prior art wherein the coupling member is used.

BRIEF DESCRIPTION OF THE DRAWINGS

FIG. 1 is an exploded perspective view;

FIG. 2 is a view in section;

FIG. 3 is a view in section taken along the line II—III in FIG. 2;

FIG. 4 is a fragmentary exploded perspective view;

FIGS. 5 and 6 are an exploded perspective view and a sectional view, respectively, showing a second embodiment;

FIGS. 7 to 9 show a third embodiment;

FIG. 7 is an exploded perspective view;

FIG. 8 is a front view in section;

FIG. 9 is a side elevation partly broken away; and

BEST MODE OF CARRYING OUT THE INVENTION

Embodiments of the present invention will be described below with reference to the drawings.

Figure 10:
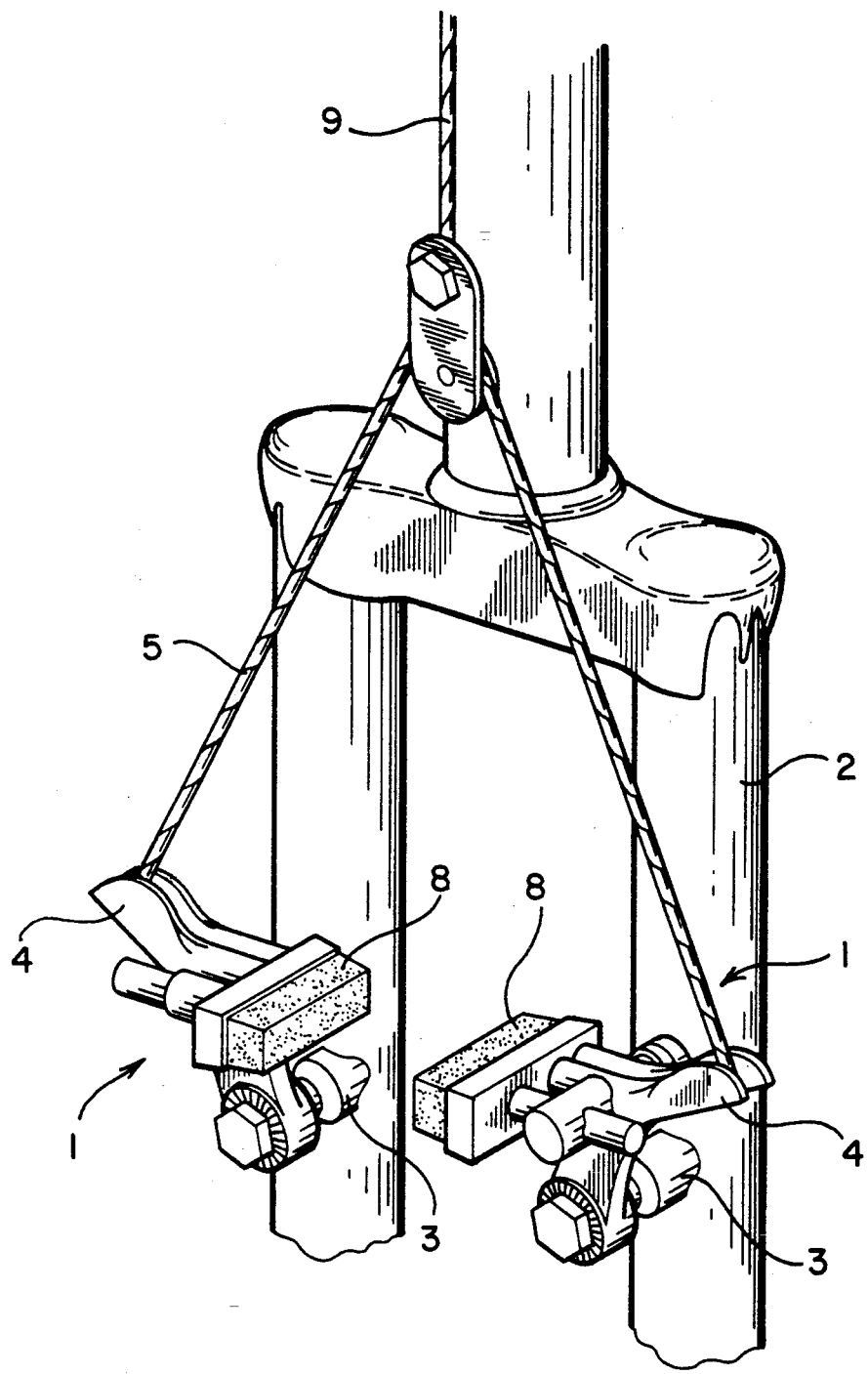
FIG. 10 is a perspective view of a cantilever brake device to which the present invention is applicable.

FIG. 10 shows a cantilever caliper brake device 1 in its entirety. A pair of opposite mounts 3 is attached to the fork of the body 2 of a bicycle by welding or with bolts. Each mount 3 has a pivot supporting one end of a brake arm 4.

The brake arm 4 is connected at the other end thereof to a yoke cable 5, has at an intermediate portion thereof a brake shoe 8 adapted to contact the rim of a wheel, and is movable about the pivot on the mount 3 by a pull cable 9 to press the brake shoe 8 against the rim for braking. The shoe is moved away from the rim by the return spring 10 to be described below.

The brake device 1 has a symmetrical construction. The return springs 10 are opposite to each other in winding direction.

With reference to the first embodiment shown in FIGS. 1 to 4, the mount 3 has a fixed portion 3A fixed to the bicycle body 2, flange 3B, stepped pivot 3C and threaded bore 3D in its forward end. A bushing 11 is fitted around the small-diameter portion of the pivot 3C, and the brake arm 4 is rotatably fitted around the bushing.

The return spring 10, which is in the form of a coil, is fitted around the busing 11, is positioned in a circular cavity 13 formed in the brake arm 4 around the bushing 11, and has one end 10A engaged in an engaging portion 14 in the form of a blind bore formed in the bottom of the cavity 13.

A support disk 15 is fitted around the large-diameter portion of the pivot 3C. The support disk 15 is provided with a retaining lug 16 and a screw support 17 formed on diametrically opposed portions of its outer periphery and bent in directions opposite to each other to extend axially of the disk. The screw support 17 has a vertical threaded bore.

The retaining lug 16 is in engagement with an engaging portion 18 formed in the flange 3B for preventing the support disk 15 from rotating relative to the pivot 3C. The engaging portion 18 is provided by forming a hole or cutout in the flange 3B or a flat portion in the outer periphery of the flange 3B.

An adjusting screw 19 is screwed in the screw support 17. The screw 19 has a square recess 19A formed in its base end for a key wrench or like turning tool to engage in, and a socket portion 20 at its head. The socket portion 20 has a recess 20A formed in its top face and having the other end 10B of the return spring 10 fitted therein.

Accordingly, when the adjusting screw 19 is rotated and thereby advanced or retracted relative to the screw support 17, the advance or retraction diametrically enlarges or contracts the return spring 19 to adjust the spring force to return the brake arm 4 relative to the mount 4.

Indicated at 21 is a hollow cylindrical dust cover for preventing dust from entering the space between the brake arm 4 and the support disk 15. The cover 21 has one end fitted in the cavity 13 of the brake arm 4, the other end bearing on the support disk 15, and a screw housing 22 at an intermediate portion thereof.

The screw housing 22 is internally provided with a four-leg portion 23 in contact with the adjusting screw 19 and the screw support 17 for holding the dust cover 21 in position, and has a hole 24, through which the tool for rotating the adjusting screw 19 from outside the dust cover 21 is inserted.

A setscrew 26 is driven into the threaded bore 3D of the mount 3 to attach a washer 25 for preventing the brake arm 4 from slipping off. The washer 25 may be made integral with the setscrew 26.

To substantially fix the support disk 15 to the mount 3, the adjusting screw 19 is supported by screw-thread engagement with the mount 3. Accordingly, the flange 3B may have the screw support 17 as projected therefrom without providing the support disk 15.

Figure 1:
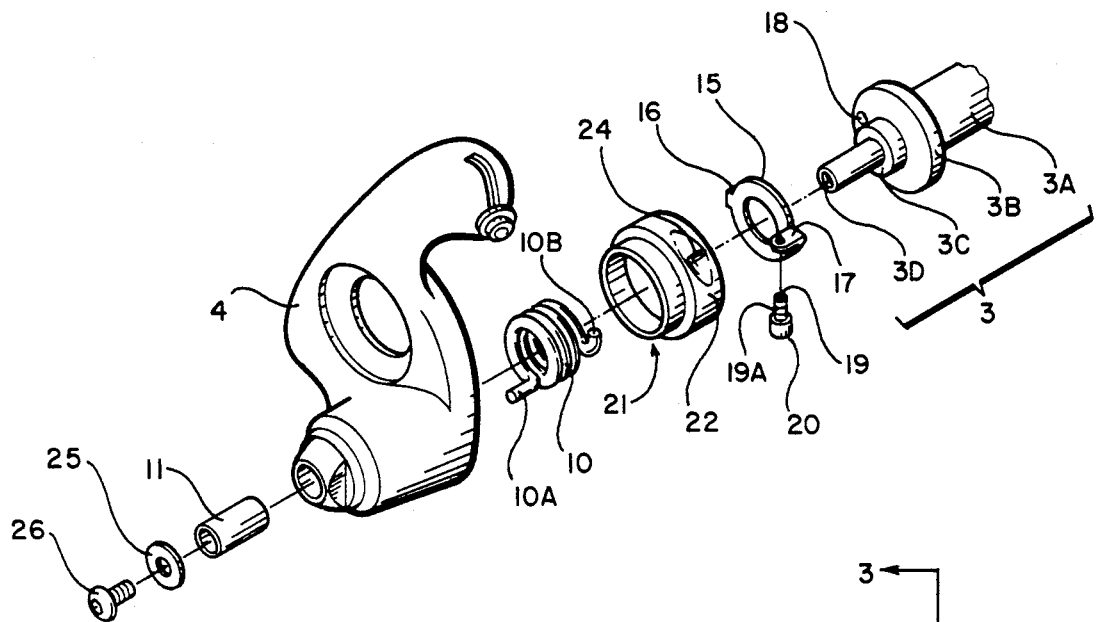
FIGS. 1 to 4 show a first embodiment of the invention.
Figure 3:
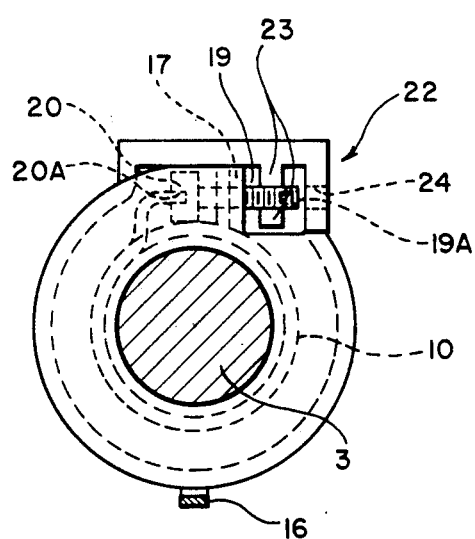
Figure 2:
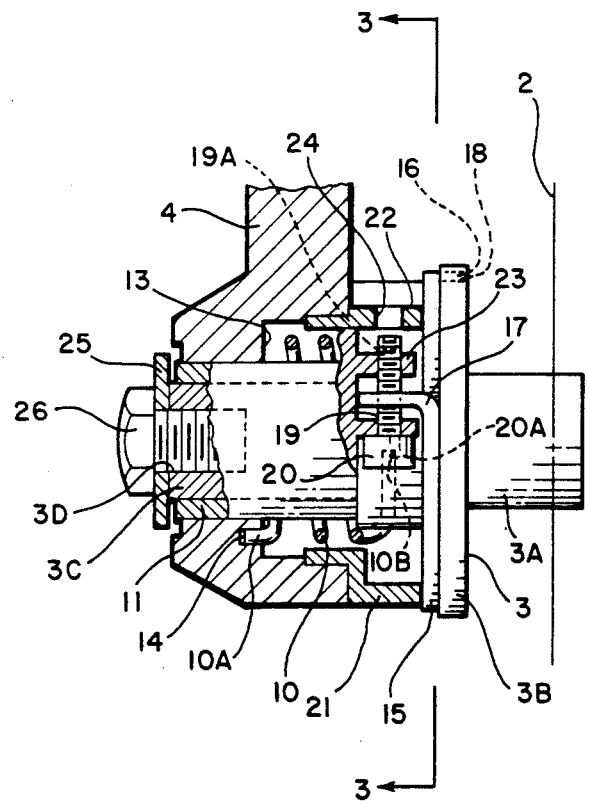
Figure 4:
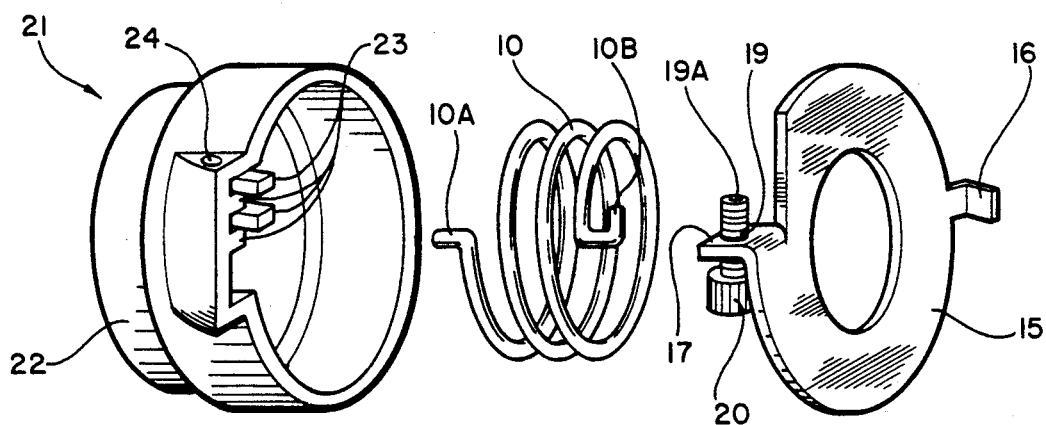
Figure 5:
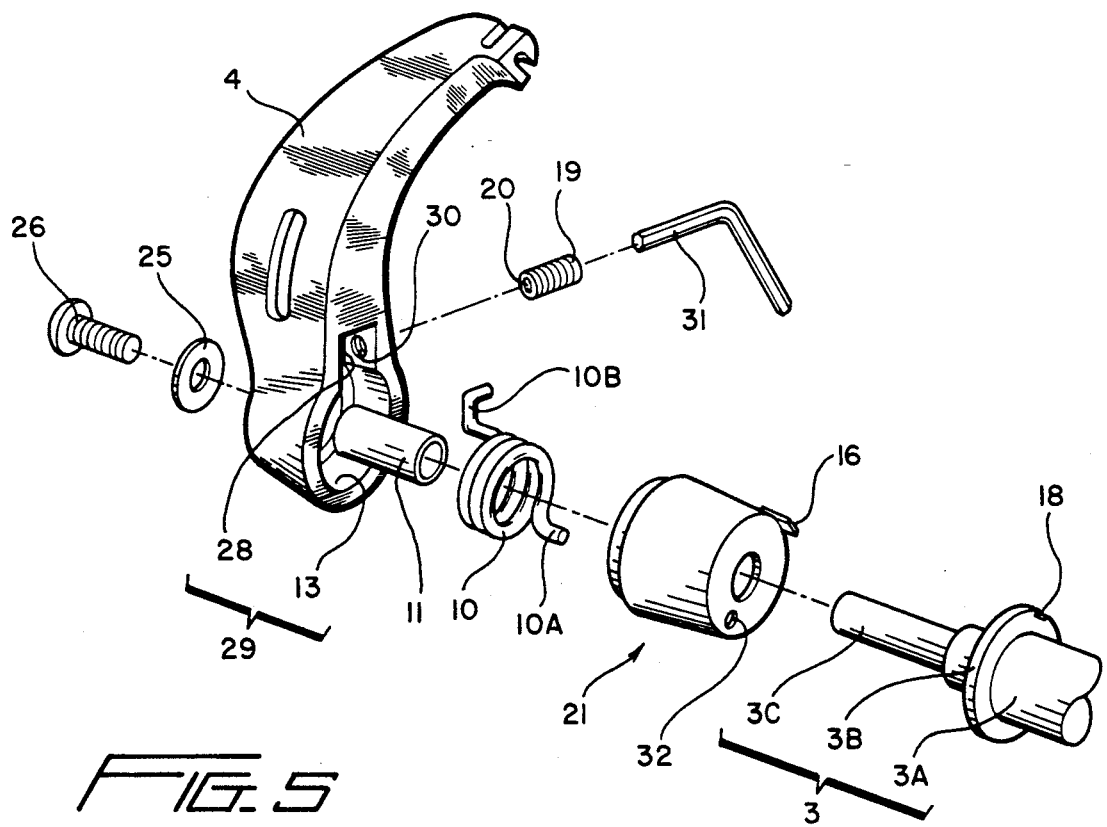

With reference to the second embodiment shown in FIGS. 5 and 6, a brake arm 4 is formed with a keylike hollow 29 comprising a circular cavity 13 around a pivot 3C and a square cavity 28 communicating therewith. A side wall defining the square cavity 28 is formed with a threaded bore 30 extending therethrough and having an adjusting screw 19 driven therein.

The adjusting screw 19 has the same diameter over the entire length thereof and is provided with a square recess 19A in its outer end face for a turning tool 31 to engage in, and a recessed socket portion 20 formed in its inner end face and having one end 10B of a return spring 10 engaged therein.

The other end 10A of the return spring 10 is engaged in a hole 32 in a hollow cylindrical dust cover 21. The dust cover 21 has one end fitted in the cavity 13 of the brake arm 4 and a retaining lug 16 formed on the outer periphery of the other end thereof and engaged with an engaging portion 18 of a flange 3B of a mount 3. Accordingly, the other end of the return spring 10 is held to the mount 3.

With the second embodiment, the above-mentioned one end of the return spring 10 is held engaged in the forward end of the adjusting screw 19 by the socket portion 20 and prevented from lateral displacement or dislodging.

FIGS. 7 to 9 show a third embodiment, in which a return spring 10 is disposed at one side of a brake arm 4, is enclosed with a dust cover 21, and has one end 10A extending radially over a distance and inserted in a cavity 34 formed in the side face of the brake arm 4 at an intermediate portion thereof.

An adjusting screw 19 is in screw-thread engagement with and extends through a side wall of the brake arm 4 defining the cavity 34 and has a forward end positioned within the cavity 34 and provided with a socket member 35. This member 35 has a recessed socket portion 20, in which the end 10A of the return spring 10 is fitted. Accordingly, the adjusting screw 19, when advanced or retracted, moves the return spring 10 to adjust the return spring force to be exerted on the brake arm 4.

The present invention is not limited to the foregoing embodiments but can be modified variously. The application of the invention is not limited to brake devices of the cantilever type, either.

INDUSTRIAL APPLICATION

The return spring force adjusting assembly of the invention for use in bicycle brake devices can be utilized for cantilever or center-pull caliper brakes.

I claim:

1. An assembly for adjusting the force of a return spring for a bicycle brake device wherein a brake arm and the return spring are fitted around a pivot on a mount fixed to the body of a bicycle, the return spring having one end held to one of the mount and the brake arm, an adjusting screw being in screw-threaded engagement with the other of the mount and the brake arm, the other end of the return spring bearing on the forward end of the adjusting screw in a manner such that threading in and out of the adjusting screw serves as a means for torsionally expanding and contracting the return spring; wherein a socket is formed in the adjusting screw at its forward end; and wherein the other end of the return spring is fitted in the socket of the adjusting screw.

2. An assembly as defined in claim 1 wherein a support disk (15) is fitted around the pivot (3C) and has a retaining lug (16) and a spring support (17) formed on diametrically opposed portions of the outer periphery of the disk and projecting axially of the pivot in directions opposite to each other, the adjusting screw (19) being in screw-thread engagement with the spring support (17).

3. An assembly as defined in claim 1 wherein the brake arm (4) is formed with a hollow (29) comprising a circular cavity (13) around the pivot (3C) and a square cavity (28) in communication therewith, and the adjusting screw (19) is screwed in a side wall defining the square cavity (28).

4. An assembly as defined in claim 1 wherein the return spring (10) is provided on one side of the brake arm and fitted around the pivot (3C), said one end of the return spring extending radially and inserted in a cavity (34) formed in the side face of the brake arm (4) at an intermediate portion thereof, the adjusting screw (19) being in screw-thread engagement with a side wall defining the cavity (34).

* * * * *